Nov. 23, 1926. 1,608,039
R. T. ROMINE
PORTABLE PLATFORM
Filed Jan. 26, 1926 2 Sheets-Sheet 1
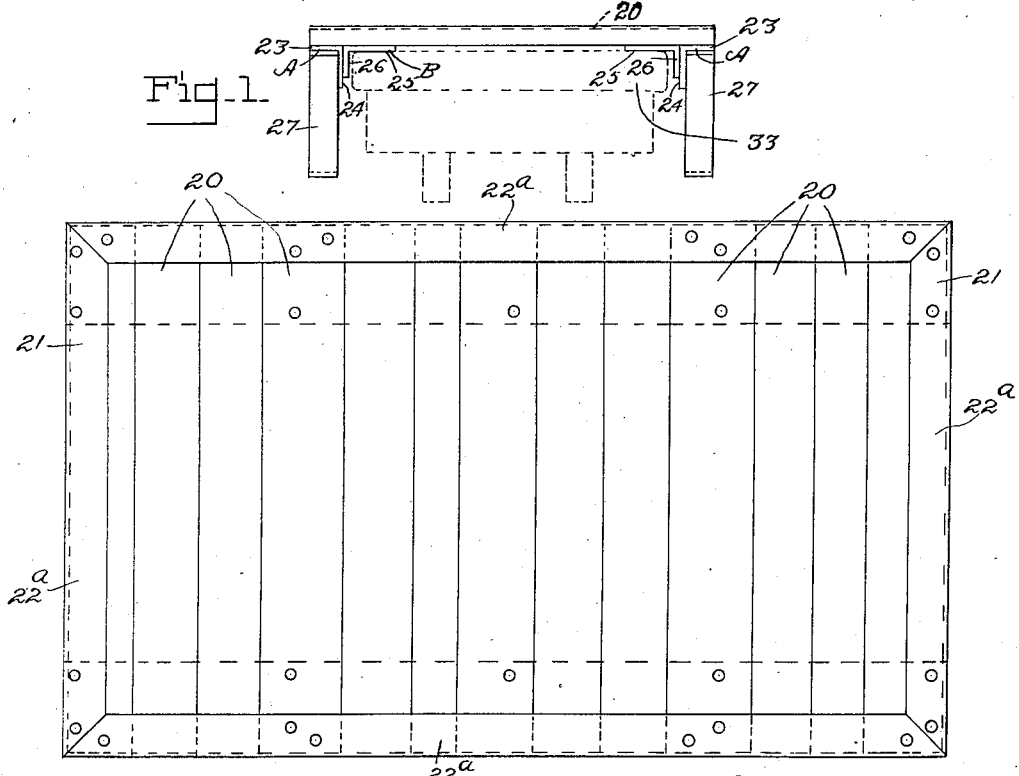

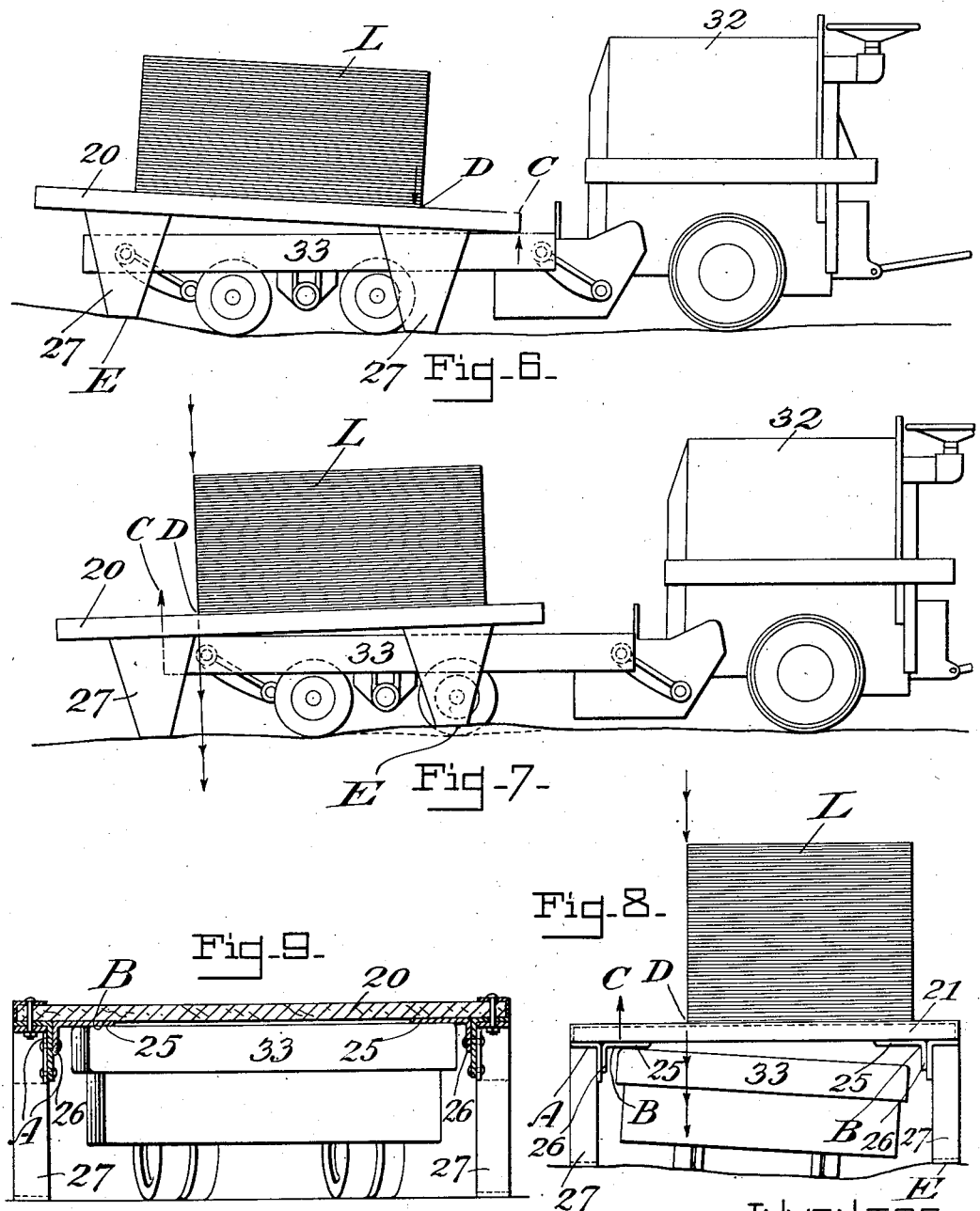

Patented Nov. 23, 1926.

1,608,039

UNITED STATES PATENT OFFICE.

ROBERT T. ROMINE, OF DETROIT, MICHIGAN.

PORTABLE PLATFORM.

Application filed January 26, 1926. Serial No. 83,947.

This invention relates to portable platforms of that class adapted to be used in conjunction with lift trucks, in which the truck lift platform may be introduced beneath the floor of the portable platform and elevated to lift and transport the same together with its load.

One of the important objects of the invention is to provide a portable load supporting platform or rack adapted for use in conjunction with the load elevating or lift platform of an industrial truck, and wherein the portable platform or rack is so constructed that the weight of the load will be uniformly distributed when the platform is supported on its legs, or when engaged by the lift platform of the truck. In addition the improved construction of the portable platform is such that the tendency of the legs to buckle or collapse, or of any parts of the platform to break or give away under the strain of extraordinarily heavy loads or the upward thrust of the truck platform is greatly minimized.

Other objects of this invention will appear in the following description and appended claims, reference being had to the accompanying drawings forming a part of this specification, wherein like reference characters designate corresponding parts in the several views.

Fig. 1 is an end elevation illustrating a load carrying platform embodying my invention, and in which the platform is shown supported on the load elevating platform of the truck.

Fig. 2 is a plan view of the improved platform.

Fig. 3 is a side elevation of the construction shown in Fig. 1.

Fig. 4 is a fragmentary transverse section.

Fig. 5 is a side view showing an industrial truck of the elevating platform type, with the portable load carrying platform shown in dotted lines.

Figs. 6 and 7 are diagrammatic side views illustrating the action of the lift truck when elevating the loaded platform under two typical conditions where the platform is not level.

Fig. 8 is an end elevation illustrating diagrammatically the lifting action of the truck under conditions where the truck platform is not level.

Fig. 9 is a transverse sectional elevation illustrating the action of the truck when at an angle beneath the portable platform.

Before explaining in detail the present improvment and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The present invention is particularly, although not exclusively, adapted for utilization in manufacturing plants to enable extraordinarily heavy loads, such as metal and metal parts, to be transported quickly and without handling in compact units from point to point in the yards of the factory, or through the factory aisles. Due to the restricted aisle spaces in the factories, and the requirement that the lift trucks have a short turning radius, the size of the portable platforms is frequently restricted to dimensions approximating seven feet in length and four feet in width. The portable platforms have heretofore been built approximately twelve inches in height so as to provide short legs with maximum supporting strength. The platforms were of sufficient height to permit the truck to be propelled beneath them, in order to raise and transport the platform and its load. Heretofore, these portable platforms were built with a capacity of two or three tons, and an overload would frequently cause the legs to buckle or collapse, and the boards of the platform top to give way or break off particularly upon the upward thrust of the truck elevating platform. No means was ever provided for distributing and receiving the upward thrust of the lift truck in order to prevent the floor boards from breaking off.

The present invention eliminates the foregoing disadvantages and enables loads widely varying in weight, and weighing as much as ten to fifteen tons, or even more, to be readily picked up and transported to withstand the impacts and upward thrust of the truck, and without at the same time requiring any considerable increase in the size of the platform or the weight thereof. The present invention enables at least five times the load to be carried and transported without danger of any of the parts buckling or collapsing as heretofore.

Referring to Figs. 1 to 5 inclusive, a load supporting platform is illustrated comprising a load supporting floor formed of a series of cross boards 20, preferably of hard wood, forming the platform top. The platform top or floor is provided around the marginal edge thereof with a rectangular angle iron frame 21, as shown in Figs. 2 and 4. The angle iron bars forming this frame comprise each a horizontal flange $22^a$ and a vertical flange $22^b$, embracing the opposite end and side edges of the floor. Located beneath the platform top and extending lengthwise thereof at each side are a pair of angle iron bars A and B which form a supporting means for the entire platform top or floor including the frame 21. The angle iron bar A is L-shaped comprising an outwardly extending horizontal flange 23 and a vertical flange 24 of greater width, and the angle bar B is likewise L-shaped having its relatively wide horizontal flange 25 extending inwardly to support the floor and its narrower vertical flange 26 back to back or in juxtaposition to the flange 24. The vertical flanges 24 and 26 of the two angle bars are preferably rigidly secured together as by riveting, thereby forming substantially an integrally united T-shaped truss structure. It will be noted that the flanges 25 of the opposed angle bars B extend inwardly and form a relatively wide bearing surface extending the entire length of the platform. It will also be seen that the opposite vertical flanges 26 of the angle bars B form a guideway for the truck platform when propelled beneath the portable platform 20.

A pair of leg supports 27 are mounted at each side of the platform 20, each thereof comprising a flat bar bent into substantially U or V-shape to provide a base and upwardly flaring leg portions 28 bent at the ends thereof to provide attaching flanges 29 which bear against the outer horizontal flanges 23 of the angle bars A. These legs are secured in place by means of bolts 30 which pass through the flanges 29 of the legs and also through the flanges 23 and $23^a$. Each leg is also secured to the vertical flange 24 of the angle bar A by means of a pair of angle brackets 31.

The portable lead carrying platform 20 is used in conjunction with an industrial truck, such as shown at 32 in Fig. 5, having a low slung chassis and load elevating platform 33. This truck is preferably constructed in accordance with my co-pending application, Serial No. 118,584, filed June 25, 1926. The truck platform is low so as to permit it being propelled beneath the portable platform 20 as shown in Fig. 5. The truck platform 33 may be vertically elevated through mechanism generally indicated at 34 so as to elevate the portable platform 20 from the ground as shown in Figure 1 and permit it being transported with its load. It will be noted particularly from Fig. 1, that the distance between the vertical guide flanges 26 of angle bars B is slightly greater than the width of the truck platform 33. As the truck is propelled forwardly beneath the platform 20, it will be guided by the flanges or guides 26. The horizontal flanges 25 of the angle bars B overlie the longitudinal edges of the truck platform 33, and hence the entire upward thrust of the truck platform 33 when elevated will be sustained by the plates or flanges 25. Since the angle bars A, B and 21 are all rigidly connected together, the lifting stress will be uniformly distributed throughout the length of the platform 20. As shown in Fig. 3, the leg supports 27 may be detachably connected to the angle bars 21 and A by means of the bolts 30 and $31^a$ so that these legs can be readily removed in order to stack the platforms 20 in a compact manner as for shipping in freight cars.

From the foregoing it will be seen that the platform boards 20 forming the platform top are bound at opposite sides and ends by structural steel members $22^a$ forming a rectangular frame 21 which is supported at opposite ends by the angle bars A and B. The angle bars A and B of each set are mounted back to back forming in combination a truss spanning the end members $22^a$ of the steel frame 21.

It will be seen that each leg 27 is sustained by the angles A and B, so that the legs will not collapse or buckle either outwardly or inwardly under heavy loads, such as from ten to fifteen tons. In addition the angle members 31 rigidly secure the portions 28 of the legs to both of the angle bars A and B, thus strengthening the legs and preventing collapse thereof.

In practice it frequently happens that the operator does not propel the lifting platform 33 of the truck the full distance beneath the loaded platform 20 before elevating the platform. Under such conditions it heretofore frequently happened that the boards of the platform at the front end of the truck platform broke off due to the uneven distribution of weight. This is entirely prevented by the present invention since the truss A and B cooperating with the steel frame 21 takes the strain from the cross boards 20.

The structural members B not only act as guides for the lifting truck but also distribute the weight of the load to the angles A. In addition they distribute the upward thrust of the truck platform to the end frames 22ª, and without any tendency to buckle where the loads are not centered on the platform.

Portable platforms in every day use in factory yards, freight yards, etc., are not only subject to wide variations in loads but are stored or deposited on uneven ground and with the loads rarely centred on the platform floor. In Figs. 6 to 9 inclusive, the platform of the present invention is illustrated carrying a ten-ton stack of sheet steel. Four typical conditions are illustrated, showing some of the reasons why the present invention enables loads at least five times as heavy as the capacity of previous types of platforms to be safely handled on the present platform, and enabling a lift truck of five times the capacity of previous types to be used.

Under conditions illustrated in Fig. 6, where the platform legs rest on uneven ground or pavement with the platform floor tilted toward the point of introduction of the lift truck platform; the latter frequently extends beneath the floor boards 20 at an angle. In this instance the initial vertical lift of the truck platform 33 will cause it to engage the end edge of the floor at C. The portable platform at this time acts as a lever, with its fulcrum at E, the lifting power or thrust at C, and the weight L intermediate these points. In all previous types of platforms, under such circumstances, the floor boards broke off at D. In the present invention the opposite angle bars 25 receive the entire thrust and distribute the leverage uniformly, preventing the floor boards from breaking.

Under conditions illustrated in Fig. 7, the truck may be introduced in the direction of tilt or slant of the platform. Both the floor and the truck platform are at an angle to each other. In this instance the initial upward thrust and lift of the truck platform is entirely directed at C in rear of the load L, and the platform again acts as a lever. Heretofore the floor boards 20 broke off at D on the transverse line indicated by the arrows, but by virtue of this invention the upward thrust of the end of the truck platform and the whole leverage is sustained by the parallel structural members 25.

In Fig. 8 another typical condition is illustrated in which some of the truck wheels drop into a hole or hollow in the ground so that the truck platform is tilted sideways beneath the floor boards 20. In this figure the load has been deposited at one end of the platform resting on the transverse angle bar 21 at the end edge of the floor. The platform again acts as a lever with the power or initial upward lift at C and the fulcrum at E. The thrust of the truck is taken along the length of the bar B at the left in the figure, which is transmitted by the bar 21, which spans the parallel truss members B, and hence the platform is tilted upwardly to the plane of the truck platform 33 without breaking the floor boards at D as heretofore. Thereafter the entire lift is taken by the parallel truss members 25 and the load sustained evenly on the truck platform.

Referring to Fig. 9, the platform 20 and truck 33 are shown on the same level. In this instance, as frequently occurs, the truck is introduced at an angle or diagonally with respect to the guides 26, in which its longitudinal axis is not parallel to the longitudinal axis of the portable platform. In other words, since in practice a substantial clearance must of necessity be provided between the side edges of the truck platform and the opposite guides 26, the truck platform frequently when elevated extends diagonally between the guides. The flanges 25 however will overlie the truck platform in any position thereof so as to receive the entire thrust thereof.

The present invention is especially adapted to be embodied in the construction of portable racks capable of holding bulky as well as heavy material, and adapted to be picked up and transported from place to place by means of a lift truck. These racks may comprise a container framework for holding material mounted on the platform floor 20 and supporting legs 27, as will be described in a divisional application to be filed.

It is to be understood that by describing in detail herein any particular form, structure, or arrangement, it is not intended to limit the invention beyond the terms of the several claims or the requirements of the prior art.

What I claim is:

1. In a loading device, a platform top comprising a load supporting floor, two pairs of angle bars extending beneath said floor at opposite ends thereof, the angle bars of each pair being positioned back to back with the vertical flanges abutting and with the horizontal flanges extending in opposite directions, and supports secured to the outer angle bars.

2. A portable load carrying platform comprising a series of transverse members forming a platform top, a pair of lengthwise extending angle bars at opposite sides of the platform beneath the ends of said members, each of said pairs of angle bars having oppositely extending outer and inner horizontal flanges supporting said transverse members, and having abutting outer and inner vertical flanges secured together, and leg supports bearing against the outer horizontal flanges and secured to the outer vertical flanges.

3. In a portable platform adapted for use with a lift truck, the combination of a load supporting floor comprising a series of cross boards, a structural member angular in cross section extending longitudinally beneath said boards at each side of the floor and said members comprising vertical guide flanges for the truck platform and horizontal flanges integral with the vertical flanges extending inwardly beneath the floor to receive the entire upward thrust of the lift truck platform at various points of thrust thereof beneath the floor, a bar angular in cross section mounted to embrace the upper transverse edge of each end board of the floor and transversely spanning both of said structural members at each end of the platform, and supporting legs for the floor.

4. A portable load platform for use with a power driven lift truck and comprising cross members providing a platform top, a pair of lengthwise extending angle bars at each longitudinal side beneath the ends of the cross members, the angle bars of each pair comprising outer and inner abutting vertical flanges and oppositely extending horizontal flanges supporting said cross members, said inner vertical flanges forming a guideway for the truck platform and the inner horizontal flanges being rigidly united to and stiffened by said vertical flanges and overlying the truck platform in position to receive the upward thrust therefrom upon elevating the same to elevate the portable platform.

5. In a portable platform adapted for use with a lift truck, the combination of a load supporting floor, a pair of L-shaped angle members extending beneath the floor along each of a pair of opposite sides thereof, the shorter flange of the inner angle member of each pair being positioned back to back with the longer flange of the outer angle member to provide a vertical guide portion for the truck, and the longer flanges of the inner angle members extending inwardly to provide together a relatively wide bearing surface to receive the upward thrust of the truck.

6. A portable platform and lift truck combination, in which the lift truck has a platform adapted to be moved to position beneath the portable platform, comprising a portable platform load supporting floor, truss members parallel throughout their length extending beneath the floor at opposite sides thereof, each thereof being angular in cross section and having an integral flange to form a guide for a lift truck and a horizontal flange extending inwardly throughout the length of the supporting floor a distance at least equal to the total clearance between the edges of the truck platform and the two guide flanges at every point throughout their length, whereby to overlie the truck platform and receive the upward thrust thereof at every possible thrust point between the floor and truck platform when the truck platform is positioned beneath the portable platform and irrespective of the relative positions of the two.

7. In a portable platform for use with a lifting truck of the type having a lifting platform adapted to be moved to position beneath the portable platform, a load supporting floor, parallel truss members extending beneath the floor at opposite sides, each thereof being T-shaped in cross section, the vertical flanges of said members forming guides for a lift truck platform with suitable working clearance and the horizontal flanges serving to support the floor with the inwardly directed flanges extending inwardly throughout the length of the supporting floor a distance at least equal to a total suitable working clearance between the two guides and the truck platform whereby to overlie the truck platform and receive the upward thrust thereof at any thrust point throughout the length of the inward horizontal flanges irrespective of the relative positions of the truck platform and the portable platform, and legs disposed wholly outside said vertical guide flanges and positioned beneath the outwardly extending horizontal flanges, said legs being secured to said truss members.

8. In a portable platform for use with a lifting truck of the type having a lifting platform adapted to be moved to position beneath the portable platform, a load supporting floor, parallel truss members extending beneath the floor at opposite sides, each thereof being T-shaped in cross section, the vertical flanges of said members forming guides for a lift truck platform with suitable working clearance and the horizontal flanges serving to support the floor with the inwardly directed flanges extending inwardly throughout the length of the supporting floor a distance at least equal to a total suitable working clearance between the two guides and the truck platform whereby to overlie the truck platform and receive the upward thrust thereof at any thrust point throughout the length of the inward horizontal flanges irrespective of the relative positions of the truck platform and the portable platform, and floor framing angle members spanning the ends of said truss members and serving as cross connecting members therefor whereby to distribute said thrusts on one of said guide members throughout the platform.

9. In a portable platform for use with a lifting truck of the type having a lifting platform adapted to be moved to position beneath the portable platform, a load supporting floor, parallel truss members extending beneath the floor at opposite sides, each thereof being T-shaped in cross section, the vertical flanges of said members forming guides for a lift truck platform with horizontal working clearance and the horizontal flanges serving to support the floor with the inwardly directed flanges extending inwardly throughout the length of the supporting floor a distance equal to a total suitable working clearance between the two guides and the truck platform whereby to overlie the truck platform and receive the upward thrust thereof at any thrust point throughout the length of the inward horizontal flanges irrespective of the relative positions of the truck platform and the portable platform, legs disposed wholly outside said vertical guide flanges and positioned beneath the outwardly extending horizontal flanges, said legs being secured to said truss members, and floor framing angle members spanning the ends of said truss members and serving as cross connecting members therefor, whereby to distribute said thrusts on one of said guide members throughout the platform.

10. In a portable platform adapted for use with a lift truck, the combination of a load supporting floor comprising a series of cross boards, a structural member T-shaped in cross section extending longitudinally beneath said boards at each side of the floor and said members comprising vertical guide flanges for the truck platform and horizontal flanges integral with the vertical flanges extending inwardly beneath the floor to receive the entire upward thrust of the lift truck platform at various points of thrust thereof beneath the floor, a bar angular in cross section mounted to embrace the outer transverse edge of each end board of the floor and transversely spanning both of said structural members at each end of the platform, and supporting legs for the floor disposed wholly outside said vertical guide flanges and beneath the outwardly extending horizontal flanges of said truss members, said supporting legs being secured to the truss members.

11. A portable platform and lift truck combination, in which the lift truck has a platform adapted to be moved to position beneath the portable platform, comprising a portable platform load supporting floor, parallel truss members extending beneath the floor at opposite sides, each of said truss members being angular in cross section, said members each having a vertical flange forming a guide for a lift truck platform with suitable working clearance between the two guides and the platform, said truss members also having inwardly extending horizontal flanges serving to support the floor with the flanges extending inwardly substantially throughout the length of the platform floor a distance at least equal to the total clearance between the two guides and the truck platform, whereby to overlie the truck platform and receive the upward thrust thereof at various points beneath the floor irrespective of the relative positions of the truck platform and the portable platform, and transverse truss members angular in cross section spanning said first named truss members at opposite ends of the floor and serving to distribute upward thrusts on either of said first named truss members.

12. A portable platform and lift truck combination, in which the lift truck has a platform adapted to be moved to position beneath the portable platform, comprising a portable platform load supporting floor, parallel truss members extending beneath the floor at opposite sides thereof, each being angular in cross section and having an integral flange to form a guide for a lift truck, and a horizontal flange extending inwardly throughout the length of the supporting floor a distance at least equal to the total clearance between the edges of the truck platform and the two guide flanges, and overlying the truck platform, when the latter is beneath the portable platform and between the guides, at every possible thrust receiving point between the platform floor and the truck platform whereby to receive the upward thrust thereof at any point beneath the floor irrespective of the relative positions of the truck platform and portable platform.

In testimony whereof I affix my signature.

ROBERT T. ROMINE.